US012156050B2

(12) United States Patent
Geng et al.

(10) Patent No.: US 12,156,050 B2
(45) Date of Patent: Nov. 26, 2024

(54) COMMUNICATIONS METHOD, COMMUNICATIONS APPARATUS, AND COMPUTER-READABLE STORAGE MEDIUM

(71) Applicant: Huawei Technologies Co., Ltd., Shenzhen (CN)

(72) Inventors: Tingting Geng, Shanghai (CN); Le Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 398 days.

(21) Appl. No.: 17/400,440

(22) Filed: Aug. 12, 2021

(65) Prior Publication Data
US 2021/0377756 A1 Dec. 2, 2021

Related U.S. Application Data

(63) Continuation of application No. PCT/CN2020/074857, filed on Feb. 12, 2020.

(30) Foreign Application Priority Data

Feb. 14, 2019 (CN) .......................... 201910115181.5

(51) Int. Cl.
H04W 24/04 (2009.01)
H04W 12/03 (2021.01)
(Continued)

(52) U.S. Cl.
CPC ........... *H04W 24/04* (2013.01); *H04W 12/03* (2021.01); *H04W 12/106* (2021.01);
(Continued)

(58) Field of Classification Search
CPC ..... H04W 24/04; H04W 76/19; H04W 76/15; H04W 76/18; H04W 12/03;
(Continued)

(56) References Cited

U.S. PATENT DOCUMENTS 9,763,283 B2 * 9/2017 Jung ..................... H04W 76/15
9,980,159 B2 5/2018 Tseng
(Continued)

FOREIGN PATENT DOCUMENTS

CN 105103517 A 11/2015
CN 105992292 A 10/2016
(Continued)

OTHER PUBLICATIONS

"RLM and RLF in Case of LTE-NR Tight Interworking," Agenda Item: 10.2.2.5, Source: Ericsson, Document for: Discussion, Decision, 3GPP TSG-RAN WG2 #97, Tdoc R2-1700918, Athens, Greece, Feb. 13-17, 2017, 2 pages.
(Continued)

*Primary Examiner* — Rasheed Gidado
(74) *Attorney, Agent, or Firm* — SLATER MATSIL, LLP

(57) ABSTRACT

A communications method, including receiving, by a second access network device, a first message from a terminal device, the first message indicating occurrence of a connection failure between the terminal device and a first access network device, where the first access network device is a master access network device that exists before the terminal device sends the first message, and the second access network device is a secondary access network device of the terminal device, sending an identifier of the terminal device to the first access network device, receiving, by the second access network device, context information that is of the terminal device on the first access network device and that is from the first access network device, and indicating, by the second access network device, to the terminal device to update to use the second access network device as a new master access network device.

18 Claims, 4 Drawing Sheets

(51) Int. Cl.
  *H04W 12/106* (2021.01)
  *H04W 76/19* (2018.01)
  *H04W 12/033* (2021.01)
  *H04W 12/037* (2021.01)
  *H04W 84/20* (2009.01)

(52) U.S. Cl.
  CPC .......... *H04W 76/19* (2018.02); *H04W 12/033* (2021.01); *H04W 12/037* (2021.01); *H04W 84/20* (2013.01)

(58) Field of Classification Search
  CPC . H04W 12/106; H04W 12/04; H04W 12/037; H04W 12/033; H04W 84/20; H04W 36/0027; H04W 36/0069; H04W 36/305; H04W 36/28
  See application file for complete search history.

(56) References Cited

U.S. PATENT DOCUMENTS

| | | | |
|---|---|---|---|
| 10,064,071 B2* | 8/2018 | Wang | H04L 43/10 |
| 10,154,534 B2* | 12/2018 | Yamamoto | H04W 76/18 |
| 10,251,111 B2 | 4/2019 | Wang | |
| 10,721,118 B2 | 7/2020 | Hong et al. | |
| 10,855,461 B2 | 12/2020 | Chang et al. | |
| 2011/0032816 A1* | 2/2011 | Isaksson | H04W 76/19 370/225 |
| 2015/0117183 A1 | 4/2015 | Heo et al. | |
| 2016/0095004 A1 | 3/2016 | Tseng | |
| 2017/0188278 A1* | 6/2017 | Ohta | H04W 36/0033 |
| 2018/0332657 A1 | 11/2018 | Fan et al. | |
| 2019/0215756 A1* | 7/2019 | Park | H04W 76/27 |
| 2020/0022055 A1 | 1/2020 | Yan et al. | |
| 2021/0160136 A1* | 5/2021 | Bao | H04L 43/0811 |

FOREIGN PATENT DOCUMENTS

| | | |
|---|---|---|
| CN | 106465203 A | 2/2017 |
| CN | 107690162 A | 2/2018 |
| CN | 108632918 A | 10/2018 |
| CN | 108632926 A | 10/2018 |
| CN | 109076383 A | 12/2018 |
| EP | 3331192 A1 | 6/2018 |

OTHER PUBLICATIONS

"RRC Message Transport for LTE-NR Tight Interworking," Agenda item: 9.2.2.3, Source: ITRI, Document for: Discussion and Decision, 3GPP TSG-RAN WG2 Meeting#96, Tdoc R2-168070, Reno, USA, Nov. 14-18, 2016, 4 pages.

"Dual Connectivity Corrections," Source to WG: Nokia Networks, Ericsson, Intel, ITRI, ZTE, Source to TSG: R2, Work Item Code: LTE_SC_enh_dualC-Core, Date: Apr. 2015, Category: F, Release: Rel-12, Change Request, 36.300, CR 0757, rev—Current Version: 12.5.0, 3GPP TSG-RAN WG2 Meeting #90, R2-152058, May 25-29, 2015, 26 pages.

* cited by examiner

COMMUNICATIONS METHOD, COMMUNICATIONS APPARATUS, AND COMPUTER-READABLE STORAGE MEDIUM

CROSS-REFERENCE TO RELATED APPLICATIONS

This application is a continuation of International Application No. PCT/CN2020/074857, filed on Feb. 12, 2020, which claims priority to Chinese Patent Application No. 201910115181.5, filed on Feb. 14, 2019. The disclosures of the aforementioned applications are hereby incorporated by reference in their entireties.

TECHNICAL FIELD

This application relates to the field of communications technologies, and more specifically, to a communications method, a communications apparatus, and a computer-readable storage medium.

BACKGROUND

By using a dual-connectivity (DC) technology, a terminal device may be connected to two access network devices, and the two access network devices may be respectively referred to as a master access network device and a secondary access network device.

Currently, if the terminal device detects that a connection failure occurs between the terminal device and the master access network device, the terminal device can only initiate a re-establishment procedure. In the re-establishment procedure, the terminal device stops all services and performs an operation such as cell selection. Therefore, in a time period from starting to execute the re-establishment procedure to completing the re-establishment procedure, the terminal device cannot perform service transmission, consequently causing service interruption. In addition, in the re-establishment procedure, the cell selection performed by the terminal device is random. In other words, the terminal device randomly selects a cell for access. The cell selected by the terminal device may belong to an original master access network device, or may belong to a new access network device. The new access network device may store context information of the terminal device, or may not store the context information of the terminal device. There may be an X2/Xn connection between the new access network device and the original master access network device, or may be no X2/Xn connection between the new access network device and the original master access network device. Therefore, if the cell selected by the terminal device belongs to a new access network device, the access network device does not store the context information of the terminal device, and there is no X2/Xn connection between the access network device and the original master access network device, the terminal device can only enter an idle state, and re-execute a procedure from the idle state to a connected state, consequently bringing a longer service interruption time.

SUMMARY

This application provides a communications method, a communications apparatus, and a computer-readable storage medium, to provide an opportunity of shortening a service interruption time of a terminal device.

According to a first aspect, an embodiment of this application provides a communications method, where the method includes a second access network device receives a first message sent by a terminal device, where the first message is used to indicate that a connection failure occurs between the terminal device and a first access network device, the first access network device is a master access network device that exists before the terminal device sends the first message, and the second access network device is a secondary access network device of the terminal device. The second access network device sends an identifier of the terminal device to the first access network device. The second access network device receives context information that is of the terminal device on the first access network device and that is sent by the first access network device. The second access network device indicates the terminal device to update the second access network device to a new master access network device. Based on the foregoing technical solution, when the connection failure occurs between the terminal device and the first access network device, the second access network device may indicate the terminal device to update the second access network device to the new master access network device. In this case, the terminal device may initiate a process of establishing a connection to the second access network device. If the terminal device successfully establishes a connection to the second access network device, the terminal device may perform communication by using the second access network device. In addition, the second access network device may directly obtain the context information of the terminal device from the first access network device. Therefore, long-time service interruption caused by re-establishing a connection to the terminal device because context information cannot be obtained can be avoided. Optionally, before the second access network device receives the first message sent by the terminal device, the second access network device establishes a connection to the terminal device.

With reference to the first aspect, in a possible implementation of the first aspect, the first message includes at least one piece of connection failure indication information and failure cause indication information. If the first message includes the failure cause indication information, the second access network device may notify the first access network device of a cause of the connection failure that occurs between the first access network device and the terminal device.

With reference to the first aspect, in a possible implementation of the first aspect, the method further includes the second access network device sends master access network device failure indication information to the first access network device, where the master access network device failure indication information is used to indicate that the connection failure occurs between the terminal device and the first access network device. In this way, the second access network device may notify the first access network device of a message indicating that the connection failure occurs between the first access network device and the terminal device, so that the first access network device learns in time that the connection failure occurs between the first access network device and the terminal device, and sends the context information of the terminal device to the second access network device. In this way, the second access network device quickly establishes a connection to the terminal device based on the context information of the terminal device, thereby shortening a service interruption time caused by the connection failure between the terminal device and the first access network device.

With reference to the first aspect, in a possible implementation of the first aspect, the first message includes the failure cause indication information, and the method further includes the second access network device sends master access network device failure cause indication information to the first access network device, where the master access network device failure cause indication information is used to indicate a cause of the connection failure that occurs between the terminal device and the first access network device. In this way, the second access network device may notify the first access network device of the cause of the connection failure that occurs between the first access network device and the terminal device. The first access network device may learn of the cause of the connection failure that occurs between the first access network device and the terminal device, and optimize a related connection parameter, to avoid occurrence of the connection failure.

With reference to the first aspect, in a possible implementation of the first aspect, the second access network device indicates, by using a second message, the terminal device to update the second access network device to the new master access network device, and security protection is performed on the second message based on a first key and a first security algorithm. Security of communication between the second access network device and the terminal device and/or integrity of transmitting a message between the second access network device and the terminal device may be ensured by using a security algorithm and a key. Optionally, the first key and the first security algorithm may be determined by the second access network device.

With reference to the first aspect, in a possible implementation of the first aspect, the method further includes the second access network device receives security indication information sent by the first access network device, where the security indication information is used to indicate at least one of a second key and a second security algorithm. The second access network device indicates, by using a second message, the terminal device to update the second access network device to the new master access network device, where when the security indication information is used to indicate the second key, security protection is performed on the second message based on a first security algorithm and the second key, when the security indication information is used to indicate the second security algorithm, security protection is performed on the second message based on a first key and the second security algorithm, or when the security indication information is used to indicate the second security algorithm and the second key, security protection is performed on the second message based on the second key and the second security algorithm. Security of communication between the second access network device and the terminal device and/or integrity of transmitting a message between the second access network device and the terminal device may be ensured by using a security algorithm and a key. In addition, the second access network device does not need to determine a new key and/or a new security algorithm, so that a workload of the second access network device can be reduced. Optionally, the first key and the first security algorithm may be determined by the second access network device.

With reference to the first aspect, in a possible implementation of the first aspect, security protection is performed, based on the first key and the first security algorithm, on a message transmitted between the terminal device and the second access network device before the connection failure occurs between the terminal device and the first access network device. Based on the foregoing technical solution, the second access network device may directly use a previously used key and a previously used security algorithm. In other words, the second access network device does not need to determine a new key and a new security algorithm, so that a workload of the second access network device can be reduced.

With reference to the first aspect, in a possible implementation of the first aspect, the identifier of the terminal device includes an identifier that is allocated by the first access network device to the terminal device and that is used to identify the terminal device on an interface between access network devices, or the identifier of the terminal device includes a cell radio network temporary identifier allocated by the first access network device to the terminal device and a physical cell identifier of a master cell served by the first access network device. The first access network device may find the context information of the terminal device in the first access network device by using the identifier of the terminal device. In addition, the identifier of the terminal device may be determined flexibly. If the identifier of the terminal device is an identifier that is allocated by the first access network device to the terminal device and that is used to identify the terminal device on an interface between access network devices, a quantity of bits of the identifier of the terminal device may be reduced, so that transmission is easier.

With reference to the first aspect, in a possible implementation of the first aspect, the cause of the connection failure that occurs between the terminal device and the first access network device includes at least one of the following a radio link failure, a reconfiguration failure in a non-handover scenario, a handover failure, and an integrity protection verification failure.

According to a second aspect, an embodiment of this application provides a communications method, where the method includes a terminal device sends a first message to a second access network device, where the first message is used to indicate that a connection failure occurs between the terminal device and a first access network device, the first access network device is a master access network device that exists before the terminal device sends the first message, and the second access network device is a secondary access network device of the terminal device. The terminal device obtains indication information sent by the second access network device, where the indication information is used to indicate the terminal device to update the second access network device to a new master access network device. Based on the foregoing technical solution, when the connection failure occurs between the terminal device and the first access network device, the second access network device may indicate the terminal device to update the second access network device to the new master access network device. In this case, the terminal device may initiate a process of establishing a connection to the second access network device. If the terminal device successfully establishes a connection to the second access network device, the terminal device may perform communication by using the second access network device. Optionally, before the terminal device sends the first message to the second access network device, the terminal device may establish dual connectivity to the first access network device and the second access network device.

With reference to the second aspect, in a possible implementation of the second aspect, that the terminal device obtains indication information sent by the second access network device includes the terminal device receives a second message sent by the second access network device. The terminal device performs security deprotection on the second message based on a target key and a target security algorithm, to obtain the indication information. Security of communication between the second access network device and the terminal device and/or integrity of transmitting a message between the second access network device and the terminal device may be ensured by using a security algorithm and a key.

With reference to the second aspect, in a possible implementation of the second aspect, the method further includes the terminal device initiates, based on the indication information, a process of establishing a connection to the second access network device.

According to a third aspect, an embodiment of this application provides a communications method, where the method includes a first access network device establishes a connection to a terminal device, where the first access network device is a master access network device of the terminal device. The first access network device receives an identifier that is of the terminal device and that is sent by a second access network device, where the second access network device is a secondary access network device of the terminal device. The first access network device determines that a connection failure occurs between the terminal device and the first access network device. The first access network device sends context information of the terminal device on the first access network device to the second access network device.

With reference to the third aspect, in a possible implementation of the third aspect, the method further includes the first access network device receives master access network device failure indication information sent by the second access network device, where the master access network device failure indication information is used to indicate that the connection failure occurs between the terminal device and the first access network device. In this way, the first access network device learns in time that the connection failure occurs between the first access network device and the terminal device, and sends the context information of the terminal device to the second access network device. In this way, the second access network device quickly establishes a connection to the terminal device based on the context information of the terminal device, thereby shortening a service interruption time caused by the connection failure between the terminal device and the first access network device.

With reference to the third aspect, in a possible implementation of the third aspect, the method further includes the first access network device receives master access network device failure cause indication information sent by the second access network device, where the master access network device failure cause indication information is used to indicate a cause of the connection failure that occurs between the terminal device and the first access network device. In this way, the first access network device may learn of the cause of the connection failure that occurs between the first access network device and the terminal device, and optimize a related connection parameter, to avoid occurrence of the connection failure.

With reference to the third aspect, in a possible implementation of the third aspect, the method further includes the first access network device sends security indication information to the second access network device, where the security indication information is used to indicate at least one of a second key and a second security algorithm. Security of communication between the second access network device and the terminal device and/or integrity of transmitting a message between the second access network device and the terminal device may be ensured by using a security algorithm and a key. In addition, the second access network device does not need to determine a new key and/or a new security algorithm, so that a workload of the second access network device can be reduced.

With reference to the third aspect, in a possible implementation of the third aspect, the identifier of the terminal device includes an identifier that is allocated by the first access network device to the terminal device and that is used to identify the terminal device on an interface between access network devices, or the identifier of the terminal device includes a cell radio network temporary identifier allocated by the first access network device to the terminal device and a physical cell identifier of a master cell served by the first access network device. The first access network device may find the context information of the terminal device in the first access network device by using the identifier of the terminal device.

With reference to the third aspect, in a possible implementation of the third aspect, the master access network device failure cause indication information includes at least one of the following: a radio link failure, a reconfiguration failure in a non-handover scenario, a handover failure, and an integrity protection verification failure.

According to a fourth aspect, an embodiment of this application provides a communications apparatus, where the apparatus includes a unit configured to perform any one of the first aspect or the possible implementations of the first aspect.

Optionally, the communications apparatus in the fourth aspect may be an access network device, or may be a component (for example, a chip or a circuit) that can be used in the access network device.

According to a fifth aspect, an embodiment of this application provides a communications apparatus, where the apparatus includes a unit configured to perform any one of the second aspect or the possible implementations of the second aspect.

Optionally, the communications apparatus in the fifth aspect may be a terminal device, or may be a component (for example, a chip or a circuit) that can be used in the terminal device.

According to a sixth aspect, an embodiment of this application provides a communications apparatus, where the apparatus includes a unit configured to perform any one of the third aspect or the possible implementations of the third aspect.

Optionally, the communications apparatus in the sixth aspect may be an access network device, or may be a component (for example, a chip or a circuit) that can be used in the access network device.

According to a seventh aspect, an embodiment of this application provides a communications apparatus, where the communications apparatus includes at least one processor, and the at least one processor is coupled to a memory, and is configured to read and execute instructions in the memory, to implement the method according to any one of the first aspect or the possible implementations of the first aspect.

Optionally, the communications apparatus in the seventh aspect may be an access network device, or may be a component (for example, a chip or a circuit) that can be used in the access network device.

According to an eighth aspect, an embodiment of this application provides a communications apparatus, where the communications apparatus includes at least one processor, and the at least one processor is coupled to a memory, and is configured to read and execute instructions in the memory, to implement the method according to any one of the second aspect or the possible implementations of the second aspect.

Optionally, the communications apparatus in the eighth aspect may be a terminal device, or may be a component (for example, a chip or a circuit) that can be used in the terminal device.

According to a ninth aspect, an embodiment of this application provides a communications apparatus, where the communications apparatus includes at least one processor, and the at least one processor is coupled to a memory, and is configured to read and execute instructions in the memory, to implement the method according to any one of the third aspect or the possible implementations of the third aspect.

Optionally, the communications apparatus in the ninth aspect may be an access network device, or may be a component (for example, a chip or a circuit) that can be used in the access network device.

According to a tenth aspect, an embodiment of this application provides a storage medium, where the storage medium stores instructions used to implement the method according to any one of the first aspect or the possible implementations of the first aspect.

According to an eleventh aspect, an embodiment of this application provides a storage medium, where the storage medium stores instructions used to implement the method according to any one of the second aspect or the possible implementations of the second aspect.

According to a twelfth aspect, an embodiment of this application provides a storage medium, where the storage medium stores instructions used to implement the method according to the third aspect.

According to a thirteenth aspect, this application provides a computer program product including instructions, where when the computer program product runs on a computer, the computer is enabled to perform the method according to any one of the first aspect or the possible implementations of the first aspect.

According to a fourteenth aspect, this application provides a computer program product including instructions, where when the computer program product runs on a computer, the computer is enabled to perform the method according to any one of the second aspect or the possible implementations of the second aspect.

According to a fifteenth aspect, this application provides a computer program product including instructions, where when the computer program product runs on a computer, the computer is enabled to perform the method according to the third aspect.

According to a sixteenth aspect, an embodiment of this application further provides a chip, where the chip may perform the method according to any one of the first aspect or the possible implementations of the first aspect.

According to a seventeenth aspect, an embodiment of this application further provides a chip, where the chip may perform the method according to any one of the second aspect or the possible implementations of the second aspect.

According to an eighteenth aspect, an embodiment of this application further provides a chip, where the chip may perform the method according to any one of the third aspect or the possible implementations of the third aspect.

According to a nineteenth aspect, an embodiment of this application provides a communications system, where the communications system may include the communications apparatus in the fourth aspect, the communications apparatus in the fifth aspect, and the communications apparatus in the sixth aspect.

According to a twentieth aspect, an embodiment of this application provides a communications system, where the communications system may include the communications apparatus in the seventh aspect, the communications apparatus in the eighth aspect, and the communications apparatus in the ninth aspect.

DETAILED DESCRIPTION OF ILLUSTRATIVE EMBODIMENTS

Figure 1:
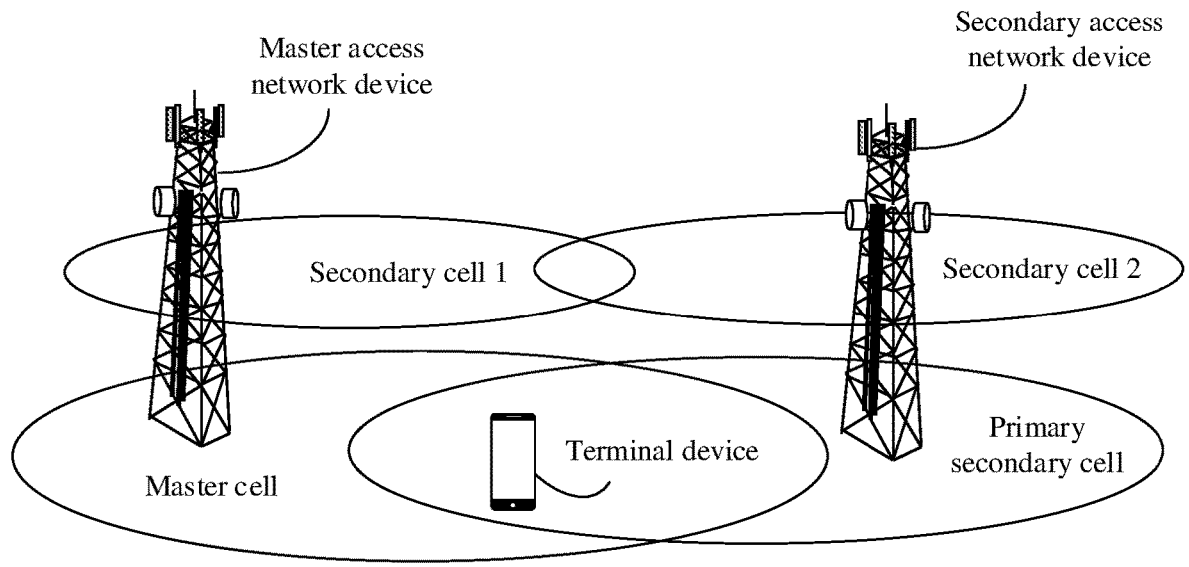
FIG. 1 is a schematic diagram of a system to which a communications method is applicable according to an embodiment of this application.

The following describes technical solutions in this application with reference to the accompanying drawings.

In this application, the term "at least one" means one or more, and the term "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one item (piece) of the following" or a similar expression thereof means any combination of the items, including any combination of singular items (pieces) or plural items (pieces). For example, at least one (piece) of a, b, or c may indicate a, b, c, a and b, a and c, b and c, or a, b, and c, where a, b, and c may be singular or plural. In addition, in this embodiment of this application, words such as "first" and "second" do not limit a quantity and an execution order.

It should be noted that in this application, the term such as "example" or "for example" is used to represent giving an example, an illustration, or descriptions. Any embodiment or design scheme described as an "example" or "for example" in this application should not be explained as being more preferable or having more advantages than another embodiment or design scheme. Exactly, use of the word "example", "for example", or the like is intended to present a related concept in a specific manner.

The technical solutions of the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communications function, a computing device, another processing device connected to a wireless modem, a vehicle-mounted device, a wearable device, a terminal device in the 5G network, a terminal device in a future evolved public land mobile network (PLMN), or the like. This is not limited in the embodiments of this application.

An access network device in the embodiments of this application may be a device configured to communicate with the terminal device. The access network device may be a base transceiver station (BTS) in the global system for mobile communications (GSM) system or the code division multiple access (CDMA) system, a NodeB (NB) in the wideband code division multiple access (WCDMA) system, an evolved NodeB (eNB or eNodeB) in the LTE system, or a radio controller in a cloud radio access network (CRAN) scenario. Alternatively, the access network device may be a relay node, an access point, a vehicle-mounted device, a wearable device, an access network device in the 5G network, an access network device in the future evolved PLMN network, or the like. This is not limited in the embodiments of this application.

In the embodiments of this application, the terminal device or the access network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or a network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry an instruction and/or data.

It may be understood that in the embodiments of this application, the terminal device and/or the network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all the operations in the embodiments of this application may be performed.

FIG. 1 is a schematic diagram of a system to which a communications method is applicable according to an embodiment of this application.

FIG. 1 shows a terminal device, and a master access network device and a secondary access network device that establish DC to the terminal device. The master access network device includes a master cell and 0 to $N_1$ secondary cells, where $N_1$ is a positive integer greater than or equal to 1. Cells served by the master access network device may be referred to as a master cell group (MCG). The secondary access network device may include a primary secondary cell and 0 to $N_2$ secondary cells, where $N_2$ is a positive integer greater than or equal to 1. Cells served by the secondary access network device may be referred to as a secondary cell group (SCG). For ease of description, FIG. 1 shows only the master cell and a secondary cell 1 in the MCG, and the primary secondary cell and a secondary cell 2 in the SCG.

The master access network device and the secondary access network device may be different types of access network devices. For example, the master access network device may be a macro base station, and the secondary access network device may be a micro base station. The master access network device and the secondary access network device may alternatively be access network devices in different communications systems. For example, the master access network device is an access network device in LTE, and the secondary access network device is an access network device in 5G. Types of the master access network device and the secondary access network device and the communications system are not limited in this embodiment of this application.

Figure 2:
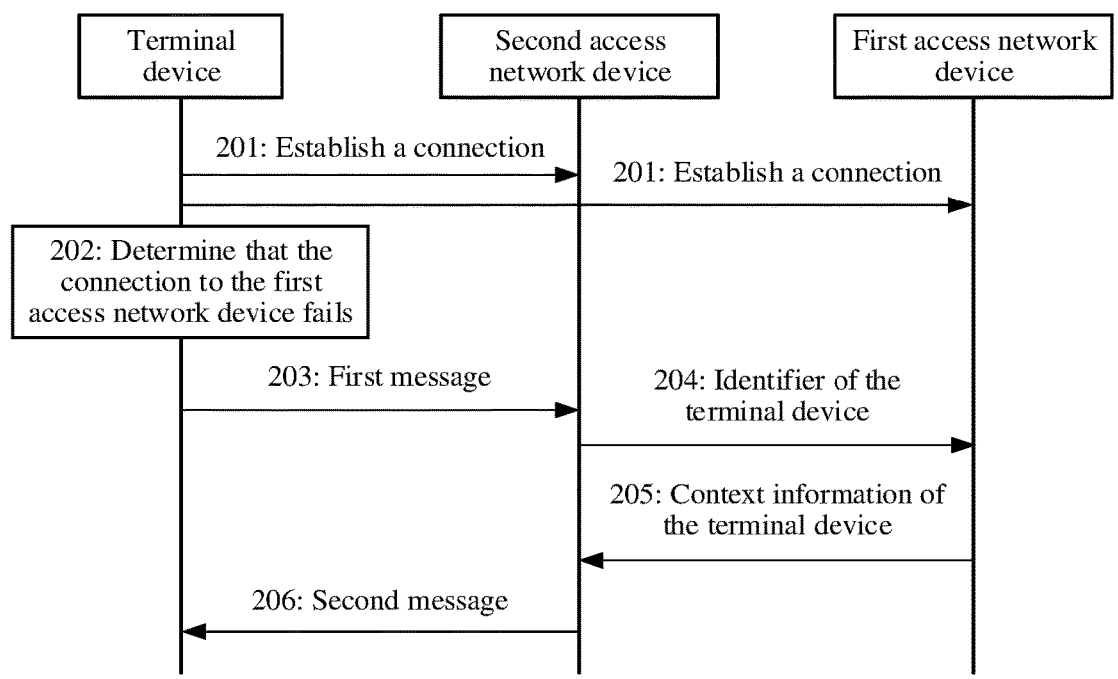
FIG. 2 is a schematic flowchart of a communications method according to an embodiment of this application.

FIG. 2 is a schematic flowchart of a communications method according to an embodiment of this application.

201: A terminal device establishes a connection to a first access network device and a connection to a second access network device, where the first access network device is a master access network device of the terminal device, and the second access network device is a secondary access network device of the terminal device. In other words, the terminal device establishes dual connectivity to the first access network device and the second access network device.

After the dual connectivity is established, the terminal device may communicate with the first access network device, and the terminal device may also communicate with the second access network device.

To ensure communications security, security protection may be performed on communication between the terminal device and an access network device based on a key and a security algorithm. The security protection includes integrity protection, or integrity protection and encryption. The security algorithm includes at least one of an integrity protection algorithm and an encryption algorithm. The integrity protection algorithm may include at least one of a control plane integrity protection algorithm and a user plane integrity protection algorithm. The encryption algorithm may include at least one of a control plane encryption algorithm and a user plane encryption algorithm.

Specifically, security protection may be performed on communication between the terminal device and the first access network device based on a key 1 and a security algorithm 1. Specifically, the key 1 may be determined by using a specified next hop chaining count (NCC). For example, the key 1 is determined by using an NCC 1. In this way, security protection may be performed, based on the key 1 and the security algorithm 1, on a message sent by the terminal device to the first access network device. After receiving the message sent by the terminal device, the first access network device may perform security deprotection by using the key 1 and the security algorithm 1. Similarly, security protection may also be performed, by using the key 1 and the security algorithm 1, on a message sent by the first access network device to the terminal device. After receiving the message sent by the first access network device, the terminal device may perform security deprotection by using the key 1 and the security algorithm 1. Both a core network device and the terminal device can determine a key. The core network device may determine the key based on an NCC, and then send, to the first access network device, the determined key and the NCC used to determine the key. The first access network device may send, to the terminal device, the NCC used to determine the key. The terminal device may determine the key based on the NCC. In other words, the core network device and the terminal device may determine the key based on the NCC according to a same rule. Therefore, the terminal device needs to know only the NCC used to determine the key, to ensure that the determined key is the same as the key determined by the core network device. The security algorithm 1 may be determined by the first access network device based on a supported security algorithm. A specific process of determining the key based on the NCC and a specific process of determining the security algorithm 1 are the same as those in a conventional technology, and details are not described herein.

Security protection may be performed on communication between the terminal device and the second access network device based on a key 2 and a security algorithm 2. Specifically, the first access network device may determine the key 2 based on the key 1 and a count value (for example, sk-Counter) used to derive a key, and then send the key 2 to the second access network device. Optionally, the first access network device may send, to the terminal device, the security algorithm 2 and the count value used to derive the key. The terminal device determines the key 2 based on the key 1 and the count value used to derive the key. In this way, security protection may be performed, by using the key 2 and the security algorithm 2, on a message sent by the terminal device to the second access network device. After receiving the message sent by the terminal device, the second access network device may perform security deprotection by using the key 2 and the security algorithm 2. Similarly, security protection may also be performed, by using the key 2 and the security algorithm 2, on a message sent by the second access network device to the terminal device. After receiving the message sent by the second access network device, the terminal device may perform security deprotection by using the key 2 and the security algorithm 2. The security algorithm 2 may be selected by the second access network device from supported security algorithms for processing. A specific process of determining the security algorithm 2 is the same as that in a conventional technology, and details are not described herein.

The security protection may be integrity protection, or may be integrity protection and encryption protection. If the security protection is integrity protection, the performing security protection based on the key and the security algorithm may include determining an integrity protection key based on the key and the integrity protection algorithm, and performing integrity protection based on the integrity protection key and the integrity protection algorithm. If the security protection is integrity protection and encryption protection, in addition to performing integrity protection in the foregoing manner, an encryption key further needs to be determined based on the key and the encryption algorithm, and encryption protection is further performed based on the encryption key and the encryption algorithm. Further, the integrity protection key may include at least one of a control plane integrity protection key and a user plane integrity protection key. The encryption key may include at least one of a control plane encryption key and a user plane encryption key. The integrity protection algorithm may include at least one of a control plane integrity protection algorithm and a user plane integrity protection algorithm. The encryption algorithm may include at least one of a control plane encryption algorithm and a user plane encryption algorithm. It may be understood that the keys and the algorithms need to be used in a corresponding combination. In an example, when integrity protection is performed on control plane signaling, the performing security protection based on the key and the security algorithm may include determining the control plane integrity protection key based on the key and the control plane integrity protection algorithm, and performing integrity protection on the control plane signaling based on the control plane integrity protection key and the control plane integrity protection algorithm. In another example, when integrity protection is performed on user plane signaling, the performing security protection based on the key and the security algorithm may include determining the user plane integrity protection key based on the key and the user plane integrity protection algorithm, and performing integrity protection on the user plane signaling based on the user plane integrity protection key and the user plane integrity protection algorithm.

202: The terminal device detects that a connection failure occurs between the terminal device and the first access network device.

A cause of the connection failure that occurs between the terminal device and the first access network device may be at least one of the following causes: a radio link failure, a reconfiguration failure in a non-handover scenario, a handover failure, and an integrity protection verification failure. In an example, for a cause why the terminal device determines that the connection failure occurs, refer to related descriptions in the $3^{rd}$ generation partnership project (3GPP) technical specification (TS) 36.331 or 3GPP TS38.331.

203: The terminal device sends a first message to the second access network device, where the first message is used to indicate that the connection failure occurs between the terminal device and the first access network device. Correspondingly, the second access network device receives the first message sent by the terminal device.

Optionally, the first message may be carried on a signaling radio bearer (SRB) 3 or an SRB 0. If the first message is carried on the SRB 0, the first message may further carry verification information, where the verification information is used by the first access network device or the second access network device to verify reliability of the first message. The verification information may be determined based on the key 2 and the security algorithm 2, or may be determined based on the key 1 and the security algorithm 1. The verification information may be determined based on master cell information and/or primary secondary cell information of the terminal device. Cell information includes at least one of a physical cell identifier, a cell radio network temporary identifier of the terminal device in a cell, and a cell identifier.

Optionally, in some embodiments, the first message may be a dedicated message. In other words, the first message may directly indicate that the connection failure occurs between the terminal device and the first access network device.

In some embodiments, the first message may include at least one piece of connection failure indication information and failure cause indication information. The connection failure indication information is used to indicate that the connection failure occurs between the terminal device and the first access network device. The failure cause indication information is used to indicate the cause of the connection failure that occurs between the terminal device and the first access network device.

In other words, in some embodiments, the terminal device may notify, by using the first message, that the connection failure occurs between the terminal device and the first access network device, but the terminal device does not notify the second access network device of the cause of the connection failure that occurs. In this case, the first message may include a bit used to indicate that the connection failure occurs. If a value of the bit is 1, it indicates that the connection failure occurs between the terminal device and the first access network device.

In some other embodiments, the terminal device may notify the second access network device of the cause of the connection failure that occurs. When obtaining the cause of the connection failure that occurs between the terminal device and the first access network device, the second access network device may determine that the connection failure occurs between the terminal device and the first access network device, and determine the cause of the connection failure that occurs between the terminal device and the first access network device. For example, it is assumed that the cause of the connection failure that occurs between the terminal device and the first access network device may be at least one of a radio link failure, a reconfiguration failure in a non-handover scenario, a handover failure, and an integrity protection verification failure. In an implementation, the first message may include four bits. Each of the four bits corresponds to a failure cause. If a value of the bit is 1, it indicates that the failure cause includes a corresponding cause. For example, the four bits respectively correspond to the radio link failure, the reconfiguration failure in the non-handover scenario, the handover failure, and the integrity protection verification failure. If the four bits are 1000, it indicates that the radio link failure occurs between the terminal device and the first access network device, or if the four bits are 0100, it indicates that the reconfiguration failure in the non-handover scenario occurs between the terminal device and the first access network device. Alternatively, in another implementation, the first message may include two bits, and different values of the two bits correspond to one failure cause.

In some other embodiments, the terminal device may notify, by using the first message, that the connection failure occurs between the terminal device and the first access network device and the cause of the connection failure that occurs.

Optionally, in some other embodiments, the first message may also indirectly notify that the connection failure occurs between the terminal device and the first access network device. For example, the first message may be a message, for example, a master cell group failure report message, used to indicate that the connection failure occurs between the terminal device and the first access network device. When determining that the connection failure occurs between the terminal device and the first access network device, the terminal device may send the master cell group failure report message to the second access network device. Optionally, the master cell group failure report message may indicate the cause of the connection failure that occurs. After receiving the master cell group failure report message, the second access network device may determine that the connection failure occurs between the terminal device and the first access network device.

204: The second access network device sends an identifier of the terminal device to the first access network device. Correspondingly, the first access network device receives the identifier that is of the terminal device and that is sent by the second access network device.

When receiving the identifier that is of the terminal device and that is sent by the second access network device, the first access network device may determine that the connection failure occurs between the first access network device and the terminal device. Alternatively, when receiving a message that is sent by the second access network device and that includes the identifier of the terminal device, the first access network device determines that the connection failure occurs between the first access network device and the terminal device.

In an example, the second access network device may send a request message for obtaining context of the terminal device, where the request message for obtaining context of the terminal device carries the identifier of the terminal device. When the first access network device receives the request message, for obtaining context of the terminal device, sent by the second access network device, the first access network device determines that the connection failure occurs between the first access network device and the terminal device.

Optionally, in some embodiments, the identifier of the terminal device may be an identifier that is allocated by the first access network device to the terminal device and that is used to identify the terminal device on an interface between access network devices.

Optionally, in some other embodiments, the identifier of the terminal device may be a cell radio network temporary identifier allocated by the first access network device to the terminal device and a physical cell identifier of a master cell served by the first access network device.

205: The first access network device sends context information of the terminal device on the first access network device to the second access network device.

The first access network device may determine the context information of the terminal device on the first access network device based on the identifier of the terminal device, and send the context information of the terminal device on the first access network device to the second access network device. In an example, the first access network device may send a response message for obtaining context of the terminal device, where the response message for obtaining context of the terminal device carries the context information of the terminal device.

Optionally, in some embodiments, the second access network device may further send at least one piece of master access network device failure indication information and master access network device failure cause indication information to the first access network device. The master access network device failure indication information is used to indicate that the connection failure occurs between the terminal device and the first access network device. The master access network device failure cause indication information is used to indicate the cause of the connection failure that occurs between the terminal device and the first access network device. It may be understood that the cause of the connection failure that occurs between the terminal device and the first access network device is notified by the terminal device to the second access network device. Therefore, the second access network device may send the master access network device failure cause indication information to the first access network device only when receiving the cause, of the connection failure, notified by the terminal device. When directly or indirectly receiving the master access network device failure indication information, the first access network device may determine that the connection failure occurs between the first access network device and the terminal device. When receiving the master access network device failure cause indication information, the first access network device may determine the cause of the connection failure that occurs between the first access network device and the terminal device.

Optionally, in some embodiments, before receiving the context information of the terminal device on the first access network device, the second access network device may send at least one piece of the master access network device failure indication information and the master access network device failure cause indication information to the first access network device. When receiving at least one piece of the master access network device failure indication information and the master access network device failure cause indication information, and determining that the connection failure occurs between the first access network device and the terminal device, the first access network device may determine the context information of the terminal device on the first access network device based on the identifier of the terminal device, and send the context information of the terminal device on the first access network device to the terminal device.

Optionally, in some embodiments, the second access network device may send the identifier of the terminal device and at least one piece of the master access network device failure indication information and the master access network device failure cause indication information to the first access network device by using a same message.

Optionally, in some other embodiments, the second access network device may send at least one piece of the master access network device failure indication information and the master access network device failure cause indication information to the first access network device by using one message, and send the identifier of the terminal device to the first access network device by using another message.

206: The second access network device indicates the terminal device to update the second access network device to a new master access network device.

Optionally, the second access network device may send the foregoing indication to the terminal device by using an SRB 1 or an SRB 3.

Optionally, in some embodiments, the second access network device may send a second message to the terminal device, where the second message is used to indicate the terminal device to update the second access network device to the new master access network device.

Optionally, in some embodiments, the second message may include one piece of dedicated update indication information, where the dedicated update indication information is used to indicate the terminal device to update the second access network device to the new master access network device. In other words, the second access network device may directly indicate, by using the dedicated update indication information, the terminal device to update the second access network device to the new master access network device.

Optionally, in some other embodiments, the second message may include signaling radio bearer configuration information. The signaling radio bearer information is used to indicate the terminal device to establish a signaling radio bearer 1, or to establish an SRB 1 and an SRB 2. When receiving the signaling radio bearer configuration information, the terminal device may determine to update the second access network device to the new master access network device. In other words, the second access network device may indirectly indicate, by using the signaling radio bearer configuration information, the terminal device to update the second access network device to the new master access network device.

After receiving the second message, the terminal device may initiate a process of establishing a connection to the second access network device. Specifically, the terminal device may establish the SRB 1 or establish the SRB 1 and the SRB 2 with the second access network device. Further, the terminal device may establish a data radio bearer (DRB) with the second access network device. Specifically, a DRB between the terminal device and the first access network device may be established between the terminal device and the second access network device.

Optionally, in some embodiments, security protection may be performed on the second message based on the key 2 and the security algorithm 2. In other words, both the key and the security algorithm that are used to perform security protection on the second message are provided by the second access network device.

Optionally, in an implementation, the key and the security algorithm that are used to perform security protection on the second message are used for communication between the terminal device and the second access network device before the terminal device determines that the connection failure occurs between the terminal device and the first access network device.

Optionally, in some other embodiments, the first access network device may further send, to the second access network device, an NCC 1 corresponding to the key 2 on the second access network device. The first access network device may send the NCC 1 to the second access network device when sending the context information of the terminal device on the first access network device. In other words, the message that carries the context information of the terminal device on the first access network device further carries the NCC 1. Certainly, the first access network device may also send the NCC 1 to the second access network device before or after step 205 by using a separate message or together with other information. The second access network device may communicate with the terminal device after receiving the NCC 1 and deriving a new key. The second access network device may derive a new key 2* based on the key 2. For example, the second access network device may perform horizontal derivation based on the key 2 and the NCC 1, to determine the key 2*. Correspondingly, the terminal device may also derive the key 2* based on the key 2 according to a same derivation rule. For example, the terminal device performs horizontal derivation based on the key 2, to determine the key 2*.

Optionally, in some other embodiments, the first access network device may further send, to the second access network device, the NCC 1 corresponding to the key 2 on the second access network device, an unused NCC 2, and a corresponding $key_{new}$. The first access network device may send the NCC 1, the NCC 2, and the $key_{new}$ to the second access network device when sending the context information of the terminal device on the first access network device. In other words, the message that carries the context information of the terminal device on the first access network device further carries the NCC 1, the NCC 2, and the $key_{new}$. Certainly, the first access network device may also send the NCC 1, the NCC 2, and the $key_{new}$ to the second access network device before or after step 205 by using a separate message or together with other information. The second access network device may communicate with the terminal device after receiving the NCC 1, the NCC 2, and the $key_{new}$ and determining a new key. The second access network device may determine, based on a comparison result between the NCC 1 and the NCC 2, for example, NCC 2>NCC 1, to perform vertical derivation. The second access network device may determine that $key_{new}$ is the key 2*, or horizontal derivation is performed based on the $key_{new}$ to determine the key 2*. Alternatively, the second access network device may determine, based on a comparison result between the NCC 1 and the NCC 2, for example, NCC 1=NCC 2, to perform horizontal derivation. The second access network device may perform horizontal derivation based on the key 2 and the NCC 1, to determine the key 2*. Security protection may be performed on the second message by using the key 2* and the security algorithm 2. The terminal device may also derive the key 2* based on the key 2 according to a same derivation rule. For example, the terminal device performs horizontal derivation based on the key 2, to determine the key 2*. Specifically, if the terminal device has no unused NCC 2, it is default that NCC 2=NCC 1, and it is determined to perform horizontal derivation. If the terminal device has an unused NCC 2, for example, NCC 2>NCC 1, the terminal device determines to perform vertical derivation, and determines a corresponding $key_{new}$ based on the NCC 2, and the terminal device determines that the $key_{new}$ is the key 2*, or after determining the $key_{new}$, the terminal device further performs horizontal derivation to determine the key 2*. In this way, the terminal device may perform security protection by using the key 2* and the security algorithm 2. In other words, both the second access network device and the terminal device may preconfigure a same key derivation rule. When the connection failure occurs between the terminal device and the first access network device, the second access network device and the terminal device may drive a same key according to the same key derivation rule, and security protection is performed on received and sent messages by using the newly derived key. In other words, both the key and the security algorithm that are used to perform security protection on the second message are provided by the second access network device. In an example, for a horizontal derivation mechanism and a vertical derivation mechanism in this embodiment of this application, refer to related descriptions in 3GPP TS33.401 or 3GPP TS33.501, and details are not described herein again.

Optionally, in some other embodiments, the second access network device may further receive security indication information sent by the first access network device, where the security indication information is used to indicate at least one of a key 1* and the security algorithm 1. In some embodiments, the security indication information may be used only to indicate the key 1*, and the second access network device may receive the key 1* sent by the first access network device. In this case, security protection may be performed on the second message by using the key 1* and the security algorithm 2. In other words, the key used to perform security protection on the second message is provided by the first access network device, and the security algorithm used to perform security protection on the second message is provided by the second access network device. In some other embodiments, the security indication information is only used to indicate the security algorithm 1. In this case, security protection may be performed on the second message by using the key 2 and the security algorithm 1. Alternatively, if the second access network device derives a new key 2*, security protection may be performed on the second message by using the key 2* and the security algorithm 1. In other words, the key used to perform security protection on the second message is provided by the second access network device, and the security algorithm used to perform security protection on the second message is provided by the first access network device. In some other embodiments, the security indication information is used to indicate the key 1* and the security algorithm 1. In this case, security protection may be performed on the second message by using the key 1* and the security algorithm 1. In other words, both the key and the security algorithm that are used to perform security protection on the second message are provided by the first access network device. Correspondingly, in this embodiment, the terminal device may determine, according to a same rule, a key and a security algorithm that are used to perform security deprotection on the second message.

Optionally, in some embodiments, the key 1* provided by the first access network device may be the same as the key 1.

Optionally, in some other embodiments, the first access network device may derive the key 1* based on the key 1. In an implementation, the first access network device may perform horizontal derivation based on the key 1 and an NCC 1 corresponding to the key 1, to determine the key 1*. In another implementation, the first access network device may perform vertical derivation based on a comparison result between an NCC 1 corresponding to the key 1 and an unused NCC ***, for example, NCC *>NCC 1, to determine the key 1*. For example, the key 1* is a key $key_{new}$ corresponding to the NCC *, or the key 1* is a key determined by performing horizontal derivation based on the $key_{new}$. The terminal device may also derive the key 1* based on the key 1 according to a same derivation algorithm. In other words, both the first access network device and the terminal device may preconfigure a same key derivation rule. When the connection failure occurs between the terminal device and the first access network device, the first access network device and the terminal device may drive a same key according to the same key derivation rule, and security protection is performed on received and sent messages by using the newly derived key. Correspondingly, the terminal device may also derive the key 1* based on the key 1** according to a same derivation rule.

Optionally, in some other embodiments, the first access network device may derive the key 1* based on the key 2. In an implementation, the first access network device may perform horizontal derivation based on the key 2 and the NCC 1 corresponding to the key 2, to determine the key 1*. In another implementation, the first access network device may perform vertical derivation based on a comparison result between the NCC 1 corresponding to the key 2 and an unused NCC ***, for example, NCC *>NCC 1, to determine the key 1*. For example, the key 1* is a key $key_{new}$ corresponding to the NCC *, or the key 1* is a key determined by performing horizontal derivation based on the $key_{new}$. The terminal device may also derive the key 1* based on the key 2 according to a same derivation algorithm. In other words, both the first access network device and the terminal device may preconfigure a same key derivation rule. When the connection failure occurs between the terminal device and the first access network device, the first access network device and the terminal device may drive a same key according to the same key derivation rule, and security protection is performed on received and sent messages by using the newly derived key. Correspondingly, the terminal device may also derive the key 1* based on the key 1 according to a same derivation rule.

Optionally, in some embodiments, the first access network device may further send key generation information to the second access network device. The key generation information is used to indicate related information for generating a key. For example, the key generation information may include sk-Counter used to generate the key 2. For another example, the key generation information may include an NCC 1 used to determine the key 1 or the key 2, or include an NCC 1 used to determine the key 1 or the key 2, an unused NCC 2, and a corresponding key $key_{new}$. For another example, when the first access network device derives the key 1*, the key generation information may further include information used to derive the key 1*. In this way, after serving as the master access network device, the second access network device may generate information by using the key to generate a new key. Correspondingly, the terminal device may also derive the key 1* based on the key 1 according to a same derivation rule.

Figure 3:
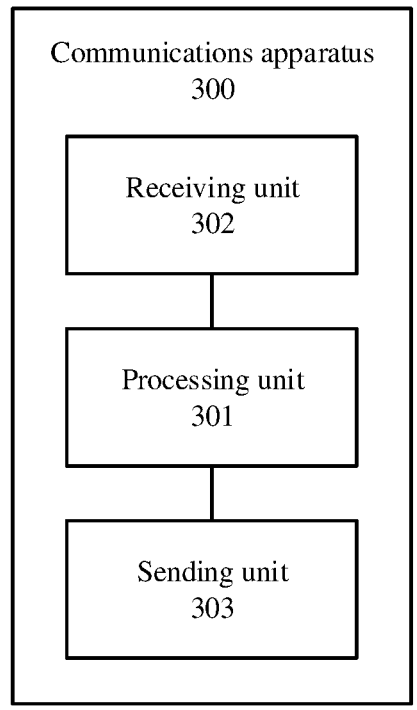
FIG. 3 is a schematic structural diagram of a communications apparatus according to an embodiment of this application.

FIG. 3 is a schematic structural diagram of a communications apparatus 300 according to an embodiment of this application. As shown in FIG. 3, the communications apparatus 300 may include a processing unit 301, a receiving unit 302, and a sending unit 303. The communications apparatus 300 may be an access network device or an apparatus (for example, a chip or a circuit) used in the access network device.

The receiving unit 302 is configured to receive a first message sent by a terminal device, where the first message is used to indicate that a connection failure occurs between the terminal device and a first access network device, the first access network device is a master access network device that exists before the terminal device sends the first message, and the communications apparatus 300 or the access network device on which the communications apparatus 300 is disposed is a secondary access network device of the terminal device.

The sending unit 303 is configured to send an identifier of the terminal device to the first access network device.

The receiving unit 302 is further configured to receive context information that is of the terminal device on the first access network device and that is sent by the first access network device.

The sending unit 303 is further configured to indicate the terminal device to update the communications apparatus 300 or the access network device on which the communications apparatus 300 is disposed to a new master access network device.

Optionally, in some embodiments, the processing unit 301 may be further configured to establish a connection to the terminal device by using the receiving unit 302 and the sending unit 303.

The processing unit 301 may be implemented by a processor, the receiving unit 302 and the sending unit 303 may be implemented by a transceiver, and the processing unit 301, the receiving unit 302, and the sending unit 303 may implement functions implemented by a second communications apparatus in the method shown in FIG. 2. For specific functions and beneficial effects of the processing unit 301, the receiving unit 302, and the sending unit 303, refer to the method shown in FIG. 2, and details are not described herein again.

Figure 4:
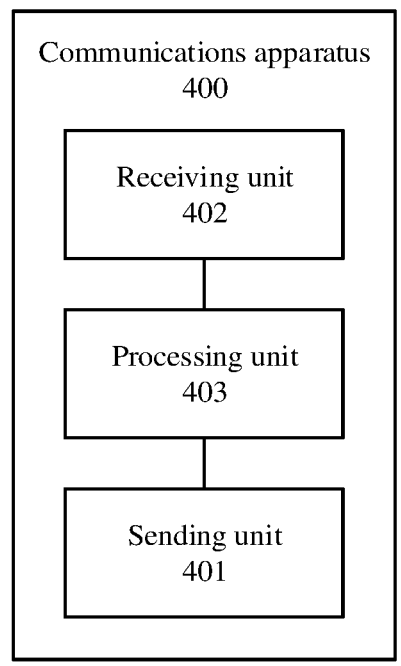
FIG. 4 is a schematic structural diagram of a communications apparatus according to an embodiment of this application.

FIG. 4 is a schematic structural diagram of a communications apparatus 400 according to an embodiment of this application. The communications apparatus 400 may include a sending unit 401 and a receiving unit 402. The communications apparatus 400 may be a terminal device or an apparatus (for example, a chip or a circuit) used in the terminal device.

The sending unit 401 is configured to send a first message to a second access network device, where the first message is used to indicate that a connection failure occurs between the communications apparatus 400 and a first access network device, the first access network device is a master access network device that exists before the terminal device sends the first message, and the second access network device is a secondary access network device of the communications apparatus 400.

The receiving unit 402 is configured to obtain indication information sent by the second access network device, where the indication information is used to indicate the terminal device to update the second access network device to a new master access network device.

Optionally, in some embodiments, the communications apparatus 400 may further include a processing unit 403. The processing unit 403 is configured to establish dual connectivity to the first access network device and the second access network device by using the sending unit 401 and the receiving unit 402.

The processing unit 403 may be implemented by a processor, the sending unit 401 and the receiving unit 402 may be implemented by a transceiver, and the processing unit 403, the sending unit 401, and the receiving unit 402 may implement functions implemented by the terminal device in the method shown in FIG. 2. For specific functions and beneficial effects of the processing unit 403, the sending unit 401, and the receiving unit 402, refer to the method shown in FIG. 2, and details are not described herein again.

Figure 5:
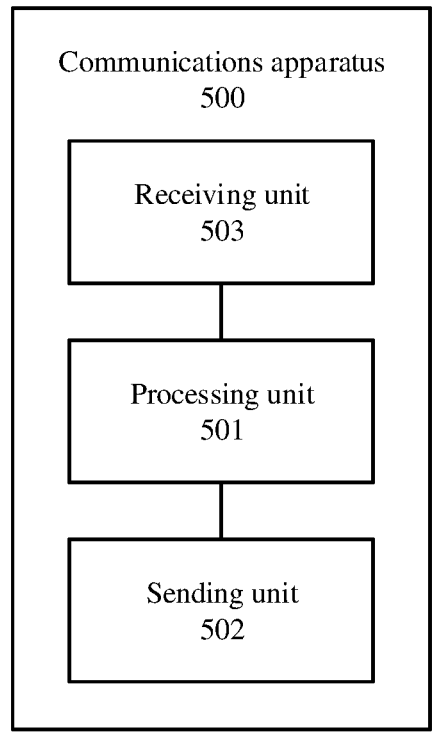
FIG. 5 is a schematic structural diagram of a communications apparatus according to an embodiment of this application.

FIG. 5 is a schematic structural diagram of a communications apparatus 500 according to an embodiment of this application. The communications apparatus 500 may include a processing unit 501, a sending unit 502, and a receiving unit 503. The communications apparatus 500 may be an access network device or an apparatus (for example, a chip or a circuit) used in the access network device.

The processing unit 501 is configured to establish a connection to a terminal device by using the sending unit 502 and the receiving unit 503, where the communications apparatus 500 or the access network device on which the communications apparatus 500 is disposed is a master access network device of the terminal device.

The receiving unit 503 is configured to receive an identifier that is of the terminal device and that is sent by a second access network device, where the access network device is a secondary access network device of the terminal device.

The processing unit 501 is further configured to determine that a connection failure occurs between the access network device and the terminal device.

The sending unit 502 is configured to send context information of the terminal device on the communications apparatus 500 to the second access network device.

The processing unit 501 may be implemented by a processor, the sending unit 502 and the receiving unit 503 may be implemented by a transceiver, and the processing unit 501, the sending unit 502, and the receiving unit 503 may implement functions implemented by the first access network device in the method shown in FIG. 2. For specific functions and beneficial effects of the processing unit 501, the sending unit 502, and the receiving unit 503, refer to the method shown in FIG. 2, and details are not described herein again.

It may be understood that one access network device may implement functions of the first access network device in the embodiment shown in FIG. 2, and may also implement functions of the second access network device in the embodiment shown in FIG. 2. For example, it is assumed that an access network device 1, an access network device 2, and an access network device 3 are three different access network devices. A terminal device 1 and a terminal device 2 are two different terminal devices. The terminal device 1 establishes dual connectivity to the access network device 1 and the access network device 2, the access network device 1 is a master access network device, and the access network device 2 is a secondary access network device. The terminal device 2 establishes dual connectivity to the access network device 2 and the access network device 1, the access network device 2 is a master access network device, and the access network device 3 is a secondary access network device. It can be learned that the access network device 2 is a secondary access network device relative to the dual connectivity established to the terminal device 1, and is a master access network device relative to the dual connectivity established to the terminal device 2.

Therefore, an embodiment of this application may further provide a communications apparatus, where the communications apparatus may be an access network device or an apparatus (for example, a chip or a circuit) used in the access network device. The communications apparatus includes a processing unit, a sending unit, and a receiving unit. The processing unit can implement functions of the processing unit in the communications apparatus shown in FIG. 3 and FIG. 5, the sending unit can implement functions of the sending unit in the communications apparatus shown in FIG. 3 and FIG. 5, and the receiving unit can implement functions of the sending unit in the communications apparatus shown in FIG. 3 and FIG. 5.

Figure 6:
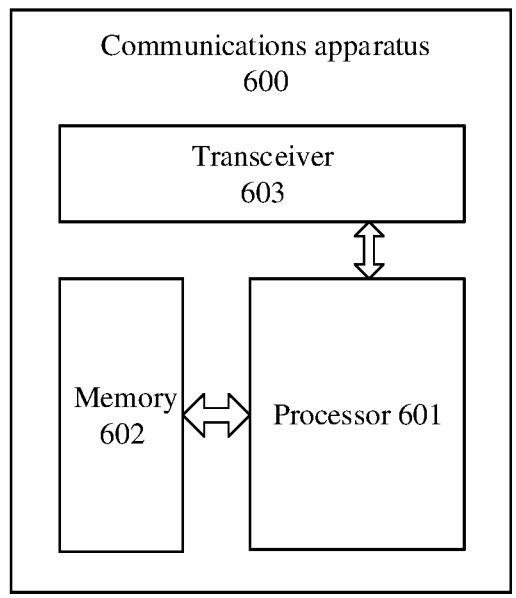
FIG. 6 is a structural block diagram of a communications apparatus according to an embodiment of this application.

FIG. 6 is a structural block diagram of a communications apparatus 600 according to an embodiment of this application. The communications apparatus 600 shown in FIG. 6 includes a processor 601, and the processor 601 may be configured to process a communications protocol and communications data, control the communications apparatus, execute a software program, process data of a software program, and the like.

Optionally, the communications apparatus 600 may further include a memory 602. The memory 602 is mainly configured to store a software program and data.

Optionally, the communications apparatus 600 may further include a transceiver 603. The transceiver may also be referred to as a transceiver unit, a transceiver, a transceiver apparatus, or the like. Optionally, a component that is in the transceiver 603 and that is configured to implement a receiving function may be considered as a receiving unit, and a component that is in the transceiver 603 and that is configured to implement a sending function may be considered as a sending unit. In other words, the transceiver 603 includes the receiving unit and the sending unit. The receiving unit may also be sometimes referred to as a receiver machine, a receiver, a receiver circuit, or the like. The sending unit may also be sometimes referred to as a transmitter machine, a transmitter, a transmitter circuit, or the like.

Optionally, the communications apparatus 600 may be an access network device or an apparatus (for example, a chip or a circuit) used in the access network device.

If the communications apparatus 600 is an access network device, the access network device may further include a radio frequency circuit and an antenna. The radio frequency circuit is mainly configured to convert a baseband signal and a radio frequency signal, and process the radio frequency signal. The antenna is mainly configured to transmit and receive a radio frequency signal in an electromagnetic wave form. The antenna and the radio frequency circuit that have a transceiver function may be considered as the transceiver 603 of the access network device.

If the communications apparatus 600 is an apparatus (for example, a chip or a circuit) used in the access network device, the communications apparatus may further include an input/output interface. The input/output interface may be configured to obtain data, and send the obtained data to the processor 601 and/or the memory 602. The input/output interface may be further configured to send, to another apparatus, data generated by the processor 601.

For ease of description, FIG. 6 shows only one memory and one processor. In an actual product, there may be one or more processors and one or more memories. The memory may also be referred to as a storage medium, a storage device, or the like. The memory may be disposed independent of the processor, or may be integrated with the processor. This is not limited in this embodiment of this application.

The processor 601, the memory 602, and the transceiver 603 communicate with each other through an internal connection path, to transfer a control and/or data signal.

The method disclosed in the foregoing embodiments of the present invention may be applied to the processor 601, or implemented by the processor 601. The processor 601 may be an integrated circuit chip and has a signal processing capability. In an implementation process, steps in the foregoing method may be implemented by using a hardware integrated logic circuit in the processor 601, or an instruction in a form of software.

The processor in the embodiments of this application may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present invention. The general purpose processor may be a microprocessor, or the processor may be any conventional processor, or the like. The steps of the method disclosed with reference to the embodiments of the present invention may be directly presented as being performed and completed by a hardware decoding processor, or performed and completed by a combination of hardware and a software module in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads instructions in the memory and completes the steps in the foregoing methods in combination with hardware of the processor.

Optionally, in some embodiments, the memory 602 may store instructions used to perform the method performed by the first access network device in the method shown in FIG. 2. The processor 601 may execute the instructions stored in the memory 602 in combination with other hardware (for example, the transceiver 603) to complete the steps performed by the first access network device in the method shown in FIG. 2. For example, the processor 601 may perform the following steps, including establishing a connection to a terminal device, where the communications apparatus 600 or the access network device on which the communications apparatus 600 is disposed is a master access network device of the terminal device, receiving an identifier that is of the terminal device and that is sent by a second access network device, where the second access network device is a secondary access network device of the terminal device, determining that a connection to the terminal device fails, and sending context information of the terminal device on the communications apparatus 600 to the second access network device. For a specific working process and beneficial effects, refer to descriptions in the embodiment shown in FIG. 2.

Optionally, in some embodiments, the memory 602 may store instructions used to perform the method performed by the second access network device in the method shown in FIG. 2. The processor 601 may execute the instructions stored in the memory 602 in combination with other hardware (for example, the transceiver 603) to complete the steps performed by the second access network device in the method shown in FIG. 2. For example, the processor 601 may perform the following steps, including receiving a first message sent by a terminal device, where the first message is used to indicate that a connection failure occurs between the terminal device and a first access network device, the first access network device is a master access network device that exists before the terminal device sends the first message, and the communications apparatus 600 or the access network device on which the communications apparatus 600 is disposed is a secondary access network device of the terminal device, sending an identifier of the terminal device to the first access network device, receiving context information that is of the terminal device on the first access network device and that is sent by the first access network device, and indicating the terminal device to update the communications apparatus 600 or the access network device on which the communications apparatus 600 is disposed to a new master access network device. For a specific working process and beneficial effects of the communications apparatus 600, refer to descriptions in the embodiment shown in FIG. 2.

If the memory 602 is not disposed in the communications apparatus 600, the processor 601 may be coupled to a memory that stores instructions used to perform the method performed by the first access network device and/or the second access network device in the method shown in FIG. 2.

An embodiment of this application further provides a chip, where the chip includes a transceiver unit and a processing unit. The transceiver unit may be an input/output circuit or a communications interface. The processing unit is a processor, a microprocessor, or an integrated circuit integrated on the chip. The chip may perform the method performed by the first access network device in the foregoing method embodiments.

An embodiment of this application further provides a computer-readable storage medium, where the computer-readable storage medium stores instructions, and when the instructions are executed, the method performed by the first access network device in the foregoing method embodiments is performed.

An embodiment of this application further provides a computer program product including instructions, where when the instructions are executed, the method performed by the first access network device in the foregoing method embodiments is performed.

An embodiment of this application further provides a chip, where the chip includes a transceiver unit and a processing unit. The transceiver unit may be an input/output circuit or a communications interface. The processing unit is a processor, a microprocessor, or an integrated circuit integrated on the chip. The chip may perform the method performed by the second access network device in the foregoing method embodiments.

An embodiment of this application further provides a computer-readable storage medium, where the computer-readable storage medium stores instructions, and when the instructions are executed, the method performed by the second access network device in the foregoing method embodiments is performed.

An embodiment of this application further provides a computer program product including instructions, where when the instructions are executed, the method performed by the second access network device in the foregoing method embodiments is performed.

Figure 7:
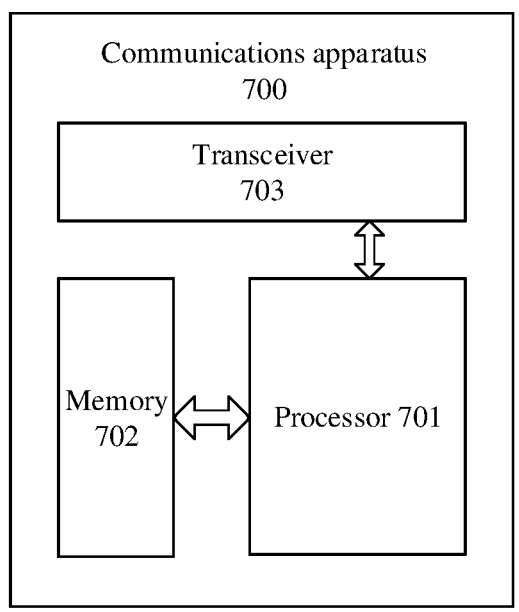
FIG. 7 is a structural block diagram of a communications apparatus according to an embodiment of the present invention.

FIG. 7 is a structural block diagram of a communications apparatus 700 according to an embodiment of this application. The communications apparatus 700 shown in FIG. 7 includes a processor 701, and the processor 701 may be configured to process a communications protocol and communications data, control the communications apparatus, execute a software program, process data of a software program, and the like.

Optionally, the communications apparatus 700 may further include a memory 702. The memory 702 is mainly configured to store a software program and data.

Optionally, the communications apparatus 700 may further include a transceiver 703. The transceiver may also be referred to as a transceiver unit, a transceiver, a transceiver apparatus, or the like. Optionally, a component that is in the transceiver 703 and that is configured to implement a receiving function may be considered as a receiving unit, and a component that is in the transceiver 703 and that is configured to implement a sending function may be considered as a sending unit. In other words, the transceiver 703 includes the receiving unit and the sending unit. The receiving unit may also be sometimes referred to as a receiver machine, a receiver, a receiver circuit, or the like. The sending unit may also be sometimes referred to as a transmitter machine, a transmitter, a transmitter circuit, or the like.

Optionally, the communications apparatus 700 may be an access network device or an apparatus (for example, a chip or a circuit) used in the access network device.

If the communications apparatus 700 is an access network device, the access network device may further include a radio frequency circuit and an antenna. The radio frequency circuit is mainly configured to convert a baseband signal and a radio frequency signal, and process the radio frequency signal. The antenna is mainly configured to transmit and receive a radio frequency signal in an electromagnetic wave form. The antenna and the radio frequency circuit that have a transceiver function may be considered as the transceiver 703 of the access network device.

If the communications apparatus 700 is an apparatus (for example, a chip or a circuit) used in the access network device, the communications apparatus may further include an input/output interface. The input/output interface may be configured to obtain data, and send the obtained data to the processor 701 and/or the memory 702. The input/output interface may be further configured to send, to another apparatus, data generated by the processor 701.

For ease of description, FIG. 7 shows only one memory and one processor. In an actual product, there may be one or more processors and one or more memories. The memory may also be referred to as a storage medium, a storage device, or the like. The memory may be disposed independent of the processor, or may be integrated with the processor. This is not limited in this embodiment of this application.

The processor 701, the memory 702, and the transceiver 703 communicate with each other through an internal connection path, to transfer a control and/or data signal.

The method disclosed in the foregoing embodiments of the present invention may be applied to the processor 701, or implemented by the processor 701. The processor 701 may be an integrated circuit chip and has a signal processing capability. In an implementation process, steps in the foregoing method may be implemented by using a hardware integrated logic circuit in the processor 701, or an instruction in a form of software.

The processor in the embodiments of this application may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present invention. The general purpose processor may be a microprocessor, or the processor may be any conventional processor, or the like. The steps of the method disclosed with reference to the embodiments of the present invention may be directly presented as being performed and completed by a hardware decoding processor, or performed and completed by a combination of hardware and a software module in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads instructions in the memory and completes the steps in the foregoing methods in combination with hardware of the processor.

Optionally, in some embodiments, the memory 702 may store instructions used to perform the method performed by the terminal in the method shown in FIG. 2. The processor 701 may execute the instructions stored in the memory 702 in combination with other hardware (for example, the transceiver 903) to complete the steps performed by the terminal device in the method shown in FIG. 2. For example, the processor 701 may perform the following steps, including sending a first message to a second access network device, where the first message is used to indicate that a connection failure occurs between the communications apparatus 700 and the first access network device, the first access network device is a master access network device that exists before the communications apparatus 700 sends the first message, and the second access network device is a secondary access network device of the communications apparatus 700, and obtaining indication information sent by the second access network device, where the indication information is used to indicate the communications apparatus 700 to update the second access network device to a new master access network device. For a specific working process and beneficial effects of the processor 701, refer to descriptions in the embodiment shown in FIG. 2.

If the memory 702 is not disposed in the communications apparatus 700, the processor 701 may be coupled to a memory that stores instructions used to perform the method performed by the terminal device in the method shown in FIG. 2.

An embodiment of this application further provides a chip, where the chip includes a transceiver unit and a processing unit. The transceiver unit may be an input/output circuit or a communications interface. The processing unit is a processor, a microprocessor, or an integrated circuit integrated on the chip. The chip may perform the method performed by the terminal device in the foregoing method embodiments.

An embodiment of this application further provides a computer-readable storage medium, where the computer-readable storage medium stores instructions, and when the instructions are executed, the method performed by the terminal device in the foregoing method embodiments is performed.

An embodiment of this application further provides a computer program product including instructions, where when the instructions are executed, the method performed by the terminal device in the foregoing method embodiments is performed.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The storage medium includes any medium that can store program code such as a universal serial bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications method, comprising:
receiving, by a second access network device, a first message from a terminal device, wherein the first message indicates an occurrence of a connection failure between the terminal device and a first access network device, wherein the first access network device is a master access network device that exists before the terminal device sends the first message, and wherein the second access network device is a secondary access network device of the terminal device;
sending, by the second access network device, an identifier of the terminal device to the first access network device;
receiving, by the second access network device, context information that is of the terminal device on the first access network device and that is from the first access network device;
indicating, by the second access network device, to the terminal device to update to use the second access network device as a new master access network device;
receiving, by the second access network device, security indication information from the first access network device, wherein the security indication information indicates at least one of a second key and a second security algorithm; and
indicating, by the second access network device using a second message, to the terminal device to update to use the second access network device as the new master access network device;
wherein at least one of:
security protection is performed on the second message based on a first security algorithm and the second key in response to the security indication information indicating the second key;
security protection is performed on the second message based on a first key and the second security algorithm in response to the security indication information indicating the second security algorithm; or
security protection is performed on the second message based on the second key and the second security algorithm in response to the security indication information indicating the second security algorithm and the second key; and
wherein security protection is performed, based on the first key and the first security algorithm, on a message transmitted between the terminal device and the second access network device before the connection failure occurs between the terminal device and the first access network device.

2. The method according to claim 1, wherein the first message comprises at least one piece of connection failure indication information and failure cause indication information.

3. The method according to claim 2, further comprising:
sending, by the second access network device, master access network device failure indication information to the first access network device, wherein the master access network device failure indication information indicates the occurrence of the connection failure between the terminal device and the first access network device.

4. The method according to claim 2, wherein the first message comprises the failure cause indication information, and wherein the method further comprises:
sending, by the second access network device, master access network device failure cause indication information to the first access network device, wherein the master access network device failure cause indication information indicates a cause of the connection failure between the terminal device and the first access network device.

5. The method according to claim 1, wherein the indicating to the terminal device to update to use the second access network device as the new master access network device comprises indicating, by the second access network device, using a second message, to the terminal device to update to use the second access network device as the new master access network device;
 wherein security protection is performed on the second message based on a first key and a first security algorithm, and wherein security protection is performed, based on the first key and the first security algorithm, a message transmitted between the terminal device and the second access network device before the connection failure occurs between the terminal device and the first access network device.

6. The method according to claim 1, wherein the identifier of the terminal device comprises at least one of:
 an identifier that is allocated by the first access network device to the terminal device and that identifies the terminal device on an interface between access network devices; or
 a cell radio network temporary identifier allocated by the first access network device to the terminal device and a physical cell identifier of a master cell served by the first access network device.

7. The method according to claim 1, wherein the cause of the connection failure that occurs between the terminal device and the first access network device comprises at least one of a radio link failure, a reconfiguration failure in a non-handover scenario, a handover failure, or an integrity protection verification failure.

8. A communications apparatus, comprising:
 at least one processor; and
 a non-transitory computer readable memory couples to the at least one processor and storing a program for execution by the at least one processor, the program including instructions for:
  sending a first message to a second access network device, wherein the first message indicates an occurrence of a connection failure between the communications apparatus and a first access network device, wherein the first access network device is a master access network device that exists before the communications apparatus sends the first message, and wherein the second access network device is a secondary access network device of the communications apparatus, wherein the first message causes the second access network device to send an identifier of a terminal device to the first access network device; and
  obtaining indication information from the second access network device, wherein the indication information indicates to the communications apparatus to update to use the second access network device as a new master access network device, and wherein availability of the indication information indicates that the second access network device received context information of the terminal device on the first access network device; and
  receiving, from the second access network device, a third message indicating to update to use the second access network device as the new master access network device, wherein the second access network device sending the third message is associated with reception, by the second access network device, of security indication information from the first access network device, wherein the security indication information indicates at least one of a second key and a second security algorithm;
 wherein at least one of:
  security protection is performed on the third message based on a first security algorithm and the second key in response to the security indication information indicating the second key;
  security protection is performed on the third message based on a first key and the second security algorithm in response to the security indication information indicating the second security algorithm; or
  security protection is performed on the third message based on the second key and the second security algorithm in response to the security indication information indicating the second security algorithm and the second key; and
 wherein security protection is performed, based on the first key and the first security algorithm, on a message transmitted between the terminal device and the second access network device before the connection failure occurs between the terminal device and the first access network device.

9. The communications apparatus according to claim 8, wherein the instructions for obtaining the indication information include instructions for:
 receiving a second message from the second access network device; and
 obtaining the indication information by performing security deprotection on the second message based on a target key and a target security algorithm.

10. The communications apparatus according to claim 8, wherein the program further includes instructions for:
 initiating, based on the indication information, a process of establishing a connection to the second access network device.

11. The communications apparatus according to claim 8, wherein the indication information is disposed in a second message.

12. A communications apparatus, comprising:
 at least one processor; and
 a non-transitory computer readable memory couples to the at least one processor and storing a program for execution by the at least one processor, the program including instructions for:
  receiving a first message from a terminal device, wherein the first message indicates an occurrence of a connection failure between the terminal device and a first access network device, wherein the first access network device is a master access network device that exists before the terminal device sends the first message, and wherein the communications apparatus is a secondary access network device of the terminal device;
  sending an identifier of the terminal device to the first access network device;
  receiving context information that is of the terminal device on the first access network device and that is from the first access network device;
  indicating to the terminal device to update to use the communications apparatus as a new master access network device;
  receiving security indication information from the first access network device, wherein the security indication information indicates at least one of a second key and a second security algorithm; and
  indicating, using a second message, to the terminal device to update to use the second access network device as a new master access network device; and wherein at least one of:
   security protection is performed on the second message based on a first security algorithm and the second key in response to the security indication information indicating the second key;
   security protection is performed on the second message based on a first key and the second security algorithm in response to the security indication information indicating the second security algorithm; or
   security protection is performed on the second message based on the second key and the second security algorithm in response to the security indication information indicating the second security algorithm and the second key; and
wherein security protection is performed, based on the first key and the first security algorithm, on a message transmitted between the terminal device and the second access network device before the connection failure occurs between the terminal device and the first access network device.

13. The communications apparatus according to claim 12, wherein the first message comprises at least one piece of connection failure indication information and failure cause indication information.

14. The communications apparatus according to claim 13, wherein the program further includes instructions for:
   sending master access network device failure indication information to the first access network device, wherein the master access network device failure indication information indicates the occurrence of the connection failure between the terminal device and the first access network device.

15. The communications apparatus according to claim 13, wherein the first message comprises the failure cause indication information; and
   wherein the program further includes instructions for:
      sending master access network device failure cause indication information to the first access network device, wherein the master access network device failure cause indication information indicates a cause of the connection failure between the terminal device and the first access network device.

16. The communications apparatus according to claim 12, wherein the instructions for indicating to the terminal device to update to use the second access network device as the new master access network device include instructions for:
   indicating, using a second message, to the terminal device to update to use the second access network device as the new master access network device,
   wherein security protection is performed on the second message based on a first key and a first security algorithm, and wherein security protection is performed, based on the first key and the first security algorithm, on a message transmitted between the terminal device and the second access network device before the connection failure occurs between the terminal device and the first access network device.

17. The communications apparatus according to claim 12, wherein the identifier of the terminal device comprises at least one of:
   an identifier that is allocated by the first access network device to the terminal device and that identifies the terminal device on an interface between access network devices; or
   a cell radio network temporary identifier allocated by the first access network device to the terminal device and a physical cell identifier of a master cell served by the first access network device.

18. The communications apparatus according to claim 12, wherein a cause of the connection failure between the terminal device and the first access network device comprises at least one of a radio link failure, a reconfiguration failure in a non-handover scenario, a handover failure, or an integrity protection verification failure.

* * * * *